July 31, 1956

I. W. LICHTENFELS 2,757,329

VARIABLE SPEED BLOWER

Filed Jan. 29, 1954

Inventor:
Ira W. Lichtenfels,
by Claude A. Noll
His Attorney.

United States Patent Office 2,757,329
Patented July 31, 1956

2,757,329

VARIABLE SPEED BLOWER

Ira W. Lichtenfels, Harborcreek, Pa., assignor to General Electric Company, a corporation of New York Application January 29, 1954, Serial No. 407,099

4 Claims. (Cl. 318—333)

This invention relates to means for varying the speed of the blower motor in response to the cooling necessary where the blower cools a resistance load of a traction motor.

The blower motor for cooling the resistors of a traction motor is often connected across the power supply to the traction motor. During the acceleration cycle when high currents are flowing through accelerating resistors, the blower for the resistors must produce a maximum cooling air flow. In the past, the size of the blower and blower motor was made large enough to handle this peak load and properly cool the resistor. Similarly, during the braking cycle, the blower motor must produce a large volume of air when the power consumption of this resistor is large. Because of this, when traction motor is disconnected from the power supply or regeneratively connected, the blower motor will take a larger portion of the supply current. As the traction motor slows down, the blower will continue to operate at top speed when a smaller volume of air would cool the resistor sufficiently. This results in undue power consumption and excessive noise.

It is, therefore, an object of my invention to provide a simple blower motor control that is responsive to load current of the resistor being cooled.

It is a further object of my invention to provide a system for increasing the speed of the blower motor when the power dissipated by the traction motor resistor is increased.

Briefly, in accordance with my invention, a blower motor is connected across a direct current power supply. A relay coil is connected across a portion of the main resistor to sense the load current of this resistor, picking up when additional cooling air is acquired. When sufficient current flows through the main resistor to require additional cooling air, the relay is energized to reduce the field excitation of the blower motor and increase voltage by shorting out a resistor. This brings the motor up to full speed to cool the main resistor sufficiently. When current through the main resistor decreases, or the resistor is shorted out; the relay drops out, changing the blower motor circuit to increase the field excitation and reduce the applied voltage thus reducing the motor speed.

The features of this invention, which I believe to be novel, are set forth with particularity in the appended claims. My invention itself, however, both as to its organization and method of operation together with further objects and advantages thereof, may best be understood by reference to the following description taken in connection with the accompanying drawings in which:

Figure 1:
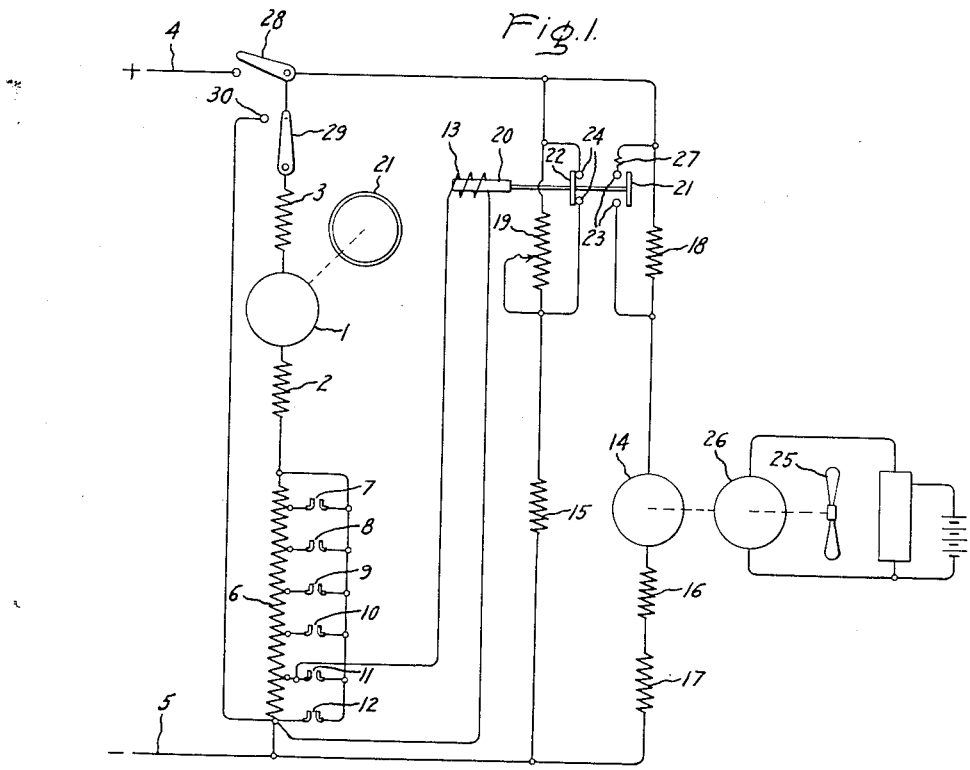
Fig. 1 is a schematic circuit diagram of one embodiment of this invention.

Referring to Fig. 1, I have shown a direct current traction motor 1 having a series field 2 and a compensating field 3 serially connected across a power supply represented by the line 4 and 5 which are positive and negative respectively. To prevent excessive currents, a main load resistance 6 having shorting contacts 7, 8, 9, 10, 11 and 12 is connected in series with the traction motor. As is well known in traction motor control, the initial current surge in a series traction motor is large until the armature has built up a back electromotive force. The motor could be damaged if no load limiting impedance were connected in series with it. I have provided a conventional load limiting resistor 6 to prevent this dangerous current. As the armature back voltage build up, the load resistance 6 may be shorted out by steps by a load sensitive control without danger of damaging the motor by excessive current. The particular control circuit of a traction motor 1 is not a portion of this invention and will not be described, but it should be noted that the main resistance will be shorted out by one contact at a time starting wih 7, then 8, etc.

A relay coil 13 is placed across a portion of this main resistance 6 to sense the resistance load current. It is preferred that this coil be placed across a portion of the resistor so that it will not be shorted out until the load resistor 6 is completely shorted out to insure sufficient cooling at all times excessive current is carried in a portion of the resistor. Thus, the relay coil 13 is connected across the last portion of the resistor instead of the whole resistor.

To keep the size of the resistor reasonably small, it is common practice to aid the heat dissipation by forced convection. In the particular system shown, the blower motor 14 is placed across the power lines 4 and 5. To allow simple control, this motor 14 is a compound motor having a shunt field 15, a series exciter field 16, and a series compensating field 17. To reduce the armature current, a resistance 18 is serially connected in the armature line. It has been found desirable to have this resistance 18 slightly greater than the series resistance of the brushes, armature, exciter, and compensating field resistances. To reduce the shunt field current, a resistance 19 is placed in series with this field. This resistance may be variable if desired depending on the speeds desired during the periods where greater cooling capacity is desired, but it has been found that this resistance operates satisfactorily when its resistance is approximately equal to that of the shunt field 15. It is also possible, of course, to have resistor 18 variable to control the slow speed, but in view of the current involved, it is not usually desirable.

To properly utilize these resistors 18 and 19, the relay core 20 of the coil 13 is connected to contactors 21 and 22 which will short resistance 18 or 19 depending on the current in resistor 6 and the coil 13. Contactor 21 is normally open, and contactor 22 is normally closed. Thus, the resistance 19 is normally shunted when the motor 1 is operating normally and the resistor 6 is shorted out or carrying a small current. When the current of resistor 6 increases to a predetermined amount, the relay 13 will pick up the core 20, opening switch 22 and placing resistance 19 in series with the shunt field 15 to reduce the flux in and increase the speed of motor 14. At the same time, contacts 23 are shorted by contactor 21 to short resistance 18 so that the current through the motor armature is substantially increased.

For cooling the load resistors such as 6, the motor drives the blower 25. The motor also drives a generator 26 to supply battery charging and other low voltage D. C. loads in the car equipment. However, the control of this generator voltage is not a part of this invention, and therefore, will not be discussed.

To prevent excessive arcing between contactor 21 and contacts 23 because of the current through this switch, a conventional magnetic blowout 27 may be placed in series with the contacts 23. However, the resistance of this magnetic blowout should be substantially less than resistance 18 or the armature resistance and may be considered negligible.

In operation, the switch 28 is closed, applying power to the traction motor through switch 29 and to the blower motor 14 through resistor 18 and contacts 24. While the motor 1 and connected wheel 31 are initially increasing in velocity, the full load resistance 6 is in the line and carrying a large current so that relay 13 is immediately picked up shorting resistor 18 and placing resistor 19 in series with the shunt field 15. The traction motor control depends on a system that is not part of this invention, but as the current of the motor 1 decreases, the switches 7, 8, 9, 10, 11, and 12 will be closed in their respective order depending on the speed called for, the velocity of the vehicle, and the current through the traction motor 1. As long as the current through the section of resistor 6 between contacts 11 and 12 is of a predetermined value, relay 13 will remain energized, and the blower motor 14 will run at a high speed causing the blower 25 to cool resistor 6 as is required during this increase in velocity period when currents are large.

As soon as contact 12 closes, resistor 6 will be shorted out of the circuit, and will not be carrying current nor require great volumes of cooling air. When contact 12 is closed, relay coil 13, if still energized, will be de-energized, and contactors 21 and 22 will return to their normal positions, thus placing resistor 18 in series with the armature of the motor 14 and shorting out resistor 19. However, the relay may open prior to the shorting of contact 12 at any time the current in resistor is less than a predetermined amount causing the voltage across coil 13 to be less than a predetermined amount. At this time, the speed of the motor 14 will be reduced, thus reducing the volume of air delivered by blower 25.

When it is desired to slow the traction motor 1 by some type of braking such as regenerative or dynamic braking, the load resistor 6 will again be utilized to prevent excessive currents. I have shown a simple system for dynamic braking that is accomplished by moving contactor 29 to contact 30 and placing the resistor 6 in series with the traction motor 1, by opening 7, 8, 9, 10, 11, and 12. As is well known, during dynamic braking, the initial current through the load resistance is large. This current will be sufficient to energize relay 13.

As the speed of the motor 1 is reduced, the contacts 7, 8, 9, 10, 11, and 12 will be closed in order, depending on the speed of the motor and the current through the motor by a control system that is not a portion of this invention. It has been found with the control systems generally used that the closing of the various contacts will not release relay coil 13 until contact 12 is closed if the load resistor 6 is being fully utilized and require the maximum cooling. When contactor 12 is closed, the motor is usually revolving at such a speed that the vehicle is traveling about 10 miles per hour.

It is clear from the discussion given during the motoring operation that as long as relay 13 is energized, resistor 19 will be in series with coil 15 and resistor 18 will be shorted out. When coil 13 is no longer carrying sufficient current to maintain energization of the relay, contact 21 will open. Any arcing at this contact will cause a current to flow through the magnetic blowout 27 which will extinguish this arc in the conventional manner.

Figure 2:
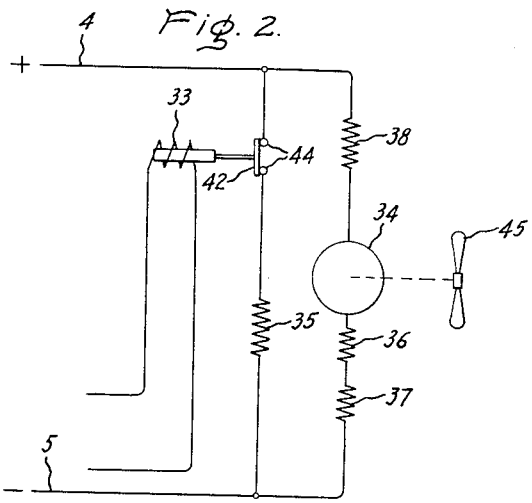
Fig. 2 illustrates another embodiment of the invention.

In Fig. 2, I have shown a blower motor 34 having a shunt field 35, a series excitation field 36, and a compensating field 37. To control the flux in motor 34, relay 33 is connected to open the circuit of the shunt field 35 by removing armature 42 from contacts 44 when the relay picks up in response to a predetermined current in the resistor being cooled by the blower 45. The operation of motor 34 after relay 33 picks up is a series D. C. motor. To prevent excessive currents, a resistor 38 may be permanently connected in series with the motor 34. However, motor 34 is designed essentially as a series D. C. motor at the voltage of the supply, and the addition of the field 35 is to increase the flux and reduce the speed of the motor during normal operation, when relay 33 is not energized.

While the particular control system is shown with a single traction motor and dynamic braking, the system would be equally applicable to a multiple unit traction system using regenerative or similar types of braking.

While I have shown particular circuits carrying out my invention, there will be understood, of course, that I do not wish to be limited thereto since many modifications may be made; and I, therefore, aim by the appended claims to cover any such modifications as fall within the true spirit and scope of my invention.

What I claim as new and desire to secure by Letters Patent of the United States is:

1. In an electric traction motor having a load limiting resistor serially connected in the armature circuit, means for controlling the flow velocity of air incident upon said resistor as a function of the magnitude of current traversing a portion of said resistor, said means comprising; a blower disposed to blow air over said resistor, an electric motor provided with a flux-excitation circuit and drivingly connected to said blower, a current-limiting means serially connected in said flux-excitation circuit, sensing means for detecting the magnitude of current traversing said resistor, and actuating means energized by said sensing means for controlling said current limiting means, whereby speed variations in said blower are dependent upon and responsive to the current in said load limiting resistor.

2. In combination with series motor having a load limiting resistor, a blower for cooling said resistor by forced convection, a compound motor drivingly connected to said blower, a control resistor serially connected in the armature circuit of said compound motor, a second control resistor serially connected in the shunt field circuit of said compound motor, and a control relay for alternately shorting said control resistors in response to predetermined currents in said load limiting resistor whereby the speed of said compound motor is varied responsive to said currents.

3. In combination with a direct current series traction motor having a series current limiting load resistor, a blower for cooling said resistor by forced convection, a direct current compound motor drivingly connected to said blower, a first control resistor serially connected in the armature circuit of said compound motor, a second control resistor serially connected in the shunt field circuit of said compound motor and having a resistance similar to that of said shunt field, a relay having an operating coil connected across a portion of said load resistor, switch means having terminals short-circuited in response to a predetermined current in said coil, said terminals connected to alternate ends of said first control resistor so that said resistor may be shorted whereby said armature current is increased and another switch means having contacts opened in response to a predetermined current in said coil, said contacts connected to alternate ends of said second control resistor so that said resistor may be placed in the circuit whereby said shunt field current is reduced.

4. In combination with a direct current series traction motor having a series limiting load resistor means for controlling the cooling of said resistor in response to current carried in said resistor comprising a blower for cooling said resistor by forced convection, a direct current compound blower motor drivingly connected to said blower, a relay having an operating coil connected across a portion of said load resistor to sense the current therein, and switch means having terminals opened in response to a predetermined current in said coil, said terminal being in series with the shunt field of said compound blower motor so that said shunt field may be de-energized whereby said blower motor operates as a series direct current motor to increase the cooling of said load resistor.

References Cited in the file of this patent

UNITED STATES PATENTS

| | | |
|---|---|---|
| 2,206,706 | Ogden | July 2, 1940 |
| 2,317,254 | Cowin | Apr. 20, 1943 |
| 2,633,541 | Justus | Mar. 31, 1953 |

FOREIGN PATENTS

| | | |
|---|---|---|
| 257,751 | Great Britain | Sept. 9, 1926 |
| 538,908 | Germany | Nov. 21, 1931 |